US010007635B2

(12) United States Patent
Hachiya et al.

(10) Patent No.: US 10,007,635 B2
(45) Date of Patent: Jun. 26, 2018

(54) COMMUNICATION APPARATUS, PORTABLE TERMINAL APPARATUS, AND COMMUNICATION SYSTEM

(71) Applicant: KYOCERA Corporation, Kyoto-shi, Kyoto (JP)

(72) Inventors: Hidetoshi Hachiya, Osaka (JP); Ryosuke Okabe, Osaka (JP)

(73) Assignee: KYOCERA Corporation, Kyoto (JP)

( * ) Notice: Subject to any disclaimer, the term of this patent is extended or adjusted under 35 U.S.C. 154(b) by 150 days.

(21) Appl. No.: 15/052,737

(22) Filed: Feb. 24, 2016

(65) Prior Publication Data

US 2016/0246750 A1 Aug. 25, 2016

(30) Foreign Application Priority Data

Feb. 25, 2015 (JP) .................................. 2015-034820

(51) Int. Cl.
*G06F 13/40* (2006.01)
*G06F 13/42* (2006.01)
*G06F 1/26* (2006.01)

(52) U.S. Cl.
CPC .......... *G06F 13/4068* (2013.01); *G06F 1/266* (2013.01); *G06F 13/4221* (2013.01)

(58) Field of Classification Search
CPC ................................ G06F 13/40; G06F 13/42
USPC ........................................................ 710/106
See application file for complete search history.

(56) References Cited

U.S. PATENT DOCUMENTS

| 5,590,414 | A | * | 12/1996 | Marui | H02J 7/0068 |
| | | | | | 379/420.01 |
| 7,404,022 | B2 | * | 7/2008 | Qin | G06F 13/4295 |
| | | | | | 710/110 |
| 7,617,342 | B2 | * | 11/2009 | Rofougaran | G01S 19/35 |
| | | | | | 235/492 |
| D610,156 | S | * | 2/2010 | Mudrick | D14/480.5 |
| 7,765,064 | B2 | * | 7/2010 | Yule | G01S 19/37 |
| | | | | | 342/357.21 |
| 7,930,531 | B2 | * | 4/2011 | Chow | G06F 21/568 |
| | | | | | 713/2 |
| 7,949,802 | B2 | * | 5/2011 | Gallant | G06F 13/4081 |
| | | | | | 710/300 |
| 8,351,747 | B1 | * | 1/2013 | Aybay | G02B 6/3895 |
| | | | | | 385/100 |

(Continued)

FOREIGN PATENT DOCUMENTS

JP 2010-166233 A 7/2010

*Primary Examiner* — Christopher Shin
(74) *Attorney, Agent, or Firm* — Procopio Cory Hargreaves and Savitch LLP

(57) ABSTRACT

A communication apparatus includes a first connector, a communication unit, and at least one processor. The first connector is configured to be attachable to and removable from a second connector of a portable telephone to which a cable is attached in transmission and reception of data to and from another device. The communication unit is configured to convert data into a radio signal and transmit the radio signal and to convert a received radio signal into data. The processor is configured to receive data from a portable telephone through the first connector, output the received data to the communication unit, receive data converted by the communication unit, and output the received data to a portable telephone through the first connector.

11 Claims, 12 Drawing Sheets

(56) References Cited

U.S. PATENT DOCUMENTS

| | | | | |
|---|---|---|---|---|
| 8,352,644 | B2* | 1/2013 | Malamant | G06F 1/3203 710/16 |
| 8,886,996 | B2* | 11/2014 | Yang | G06F 11/267 714/27 |
| 2003/0056196 | A1* | 3/2003 | Kim | G06F 11/362 717/124 |
| 2006/0179144 | A1* | 8/2006 | Nagase | G06F 13/387 709/226 |
| 2007/0073914 | A1* | 3/2007 | Yoshida | H04W 84/18 710/10 |
| 2008/0065805 | A1* | 3/2008 | Wu | G06F 1/186 710/301 |
| 2010/0041363 | A1* | 2/2010 | Griffin, Jr. | H04B 1/088 455/344 |
| 2010/0042826 | A1* | 2/2010 | Bull | H04N 21/41407 713/100 |
| 2010/0131687 | A1* | 5/2010 | Li | H04W 4/18 710/106 |
| 2010/0211708 | A1* | 8/2010 | Rohaly | G06F 13/387 710/63 |
| 2013/0282928 | A1* | 10/2013 | Winestein | G06F 3/0659 710/5 |
| 2014/0013015 | A1* | 1/2014 | Chang | G06F 13/28 710/22 |

* cited by examiner

OPERATION ITEM SCREEN

POSITION CHECK SCREEN

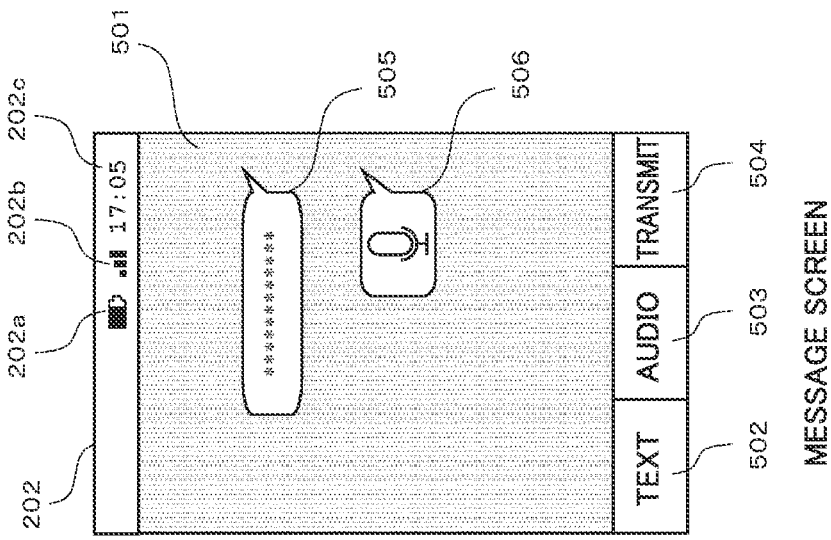
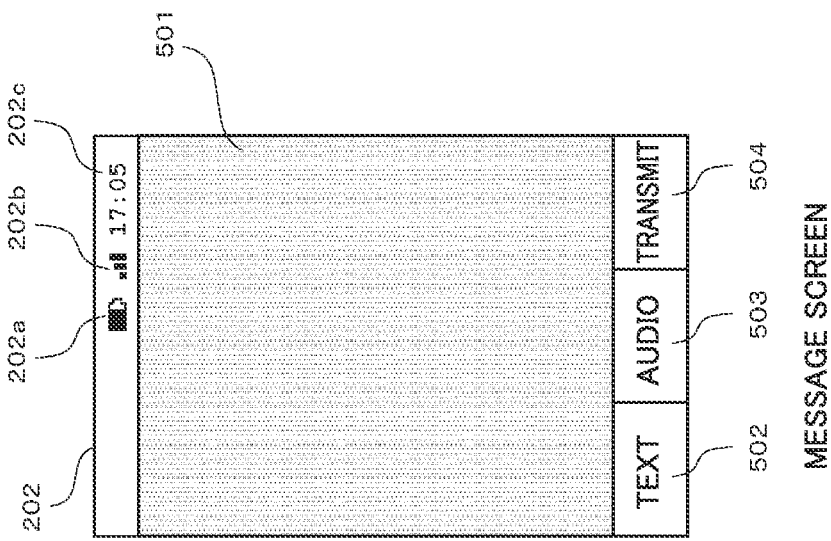

FIG.12A
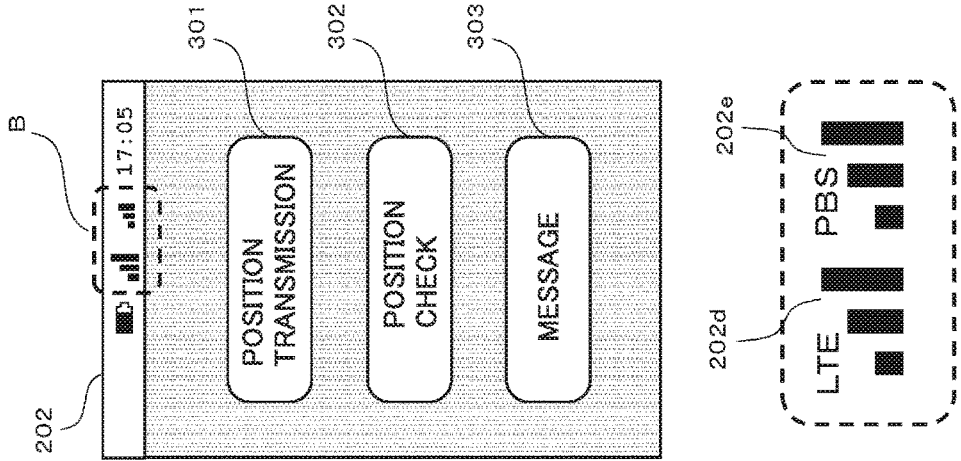
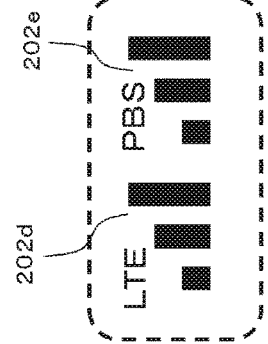
ENLARGED VIEW OF A
FIG.12B
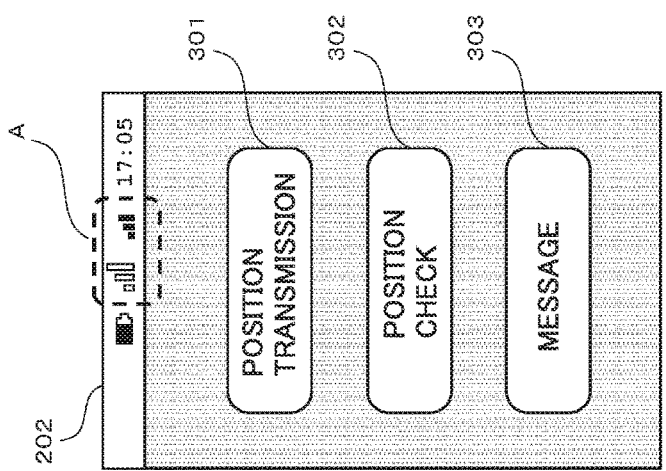
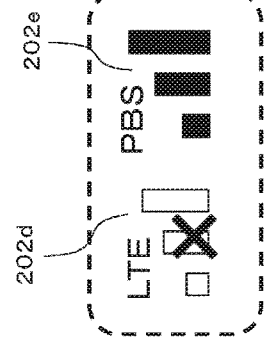
ENLARGED VIEW OF B

COMMUNICATION APPARATUS, PORTABLE TERMINAL APPARATUS, AND COMMUNICATION SYSTEM

CROSS-REFERENCE TO RELATED APPLICATION

The present application claims priority under 35 U.S.C. § 119 to Japanese Patent Application No. 2015-034820, filed on Feb. 25, 2015, entitled "Communication Apparatus, Portable Terminal Apparatus, and Communication System". The content of which is incorporated by reference herein in its entirety.

FIELD

The present disclosure relates to a communication apparatus removably attached to a portable terminal apparatus such as a portable telephone, a personal digital assistant (PDA), and a tablet PC, a portable terminal apparatus, and a communication system.

BACKGROUND

A portable terminal apparatus such as a portable telephone has conventionally transmitted and received data such as text data or audio data to and from another portable terminal apparatus via a base station.

SUMMARY

A communication apparatus in one embodiment of the present disclosure includes a first connector, a communication unit, and at least one processor. The first connector is attachable to and removable from a second connector of the portable terminal apparatus to which a cable is attached in transmission and reception of data to and from another device. The communication unit converts data into a radio signal and transmits the radio signal, and converts a received radio signal into data. The processor receives data from the portable terminal apparatus through the first connector, outputs the received data to the communication unit, receives data converted by the communication unit, and outputs the received data to the portable terminal apparatus through the first connector.

A portable terminal apparatus in one embodiment of the present disclosure includes a second connector to which a cable is attached in transmission and reception of data to and from another device. The portable terminal apparatus can be connected to a communication apparatus. The communication apparatus has a first connector configured to be attachable to and removable from the second connector and a communication unit configured to convert data into a radio signal and transmit the radio signal and to convert a received radio signal into data. The portable terminal apparatus includes a display unit and at least one processor. The processor is configured to have the display unit display an operation screen used for an operation to output data to the communication apparatus when the first connector of the communication apparatus is attached to the second connector.

A communication system in one embodiment of the present disclosure has a portable terminal apparatus and a communication apparatus. The portable terminal apparatus includes a second connector to which a cable is connected in transmission and reception of data to and from another device. The communication apparatus includes a first connector, a communication unit, and at least one processor. The first connector is attachable to and removable from the second connector of the portable terminal apparatus. The communication unit is configured to convert data into a radio signal and transmit the radio signal and to convert a received radio signal into data. The processor is configured to receive data from the portable terminal apparatus through the first connector, output the received data to the communication unit, receive data converted by the communication unit, and output the received data to the portable terminal apparatus through the first connector.

BRIEF DESCRIPTION OF THE DRAWINGS

FIG. 9A is a diagram showing one example of various operation screens displayed on the display when the transmission and reception control processing is performed according to an embodiment.

FIG. 9B is a diagram showing another example of various operation screens displayed on the display when the transmission and reception control processing is performed according to an embodiment.

FIG. 12A is a diagram showing one example of a screen showing each communication state of communication via a base station and communication via a communication apparatus on the display according to another modification.

FIG. 12B is a diagram showing another example of the screen showing each communication state of communication via the base station and communication via the communication apparatus on the display according to another modification.

DETAILED DESCRIPTION

Figure 1:
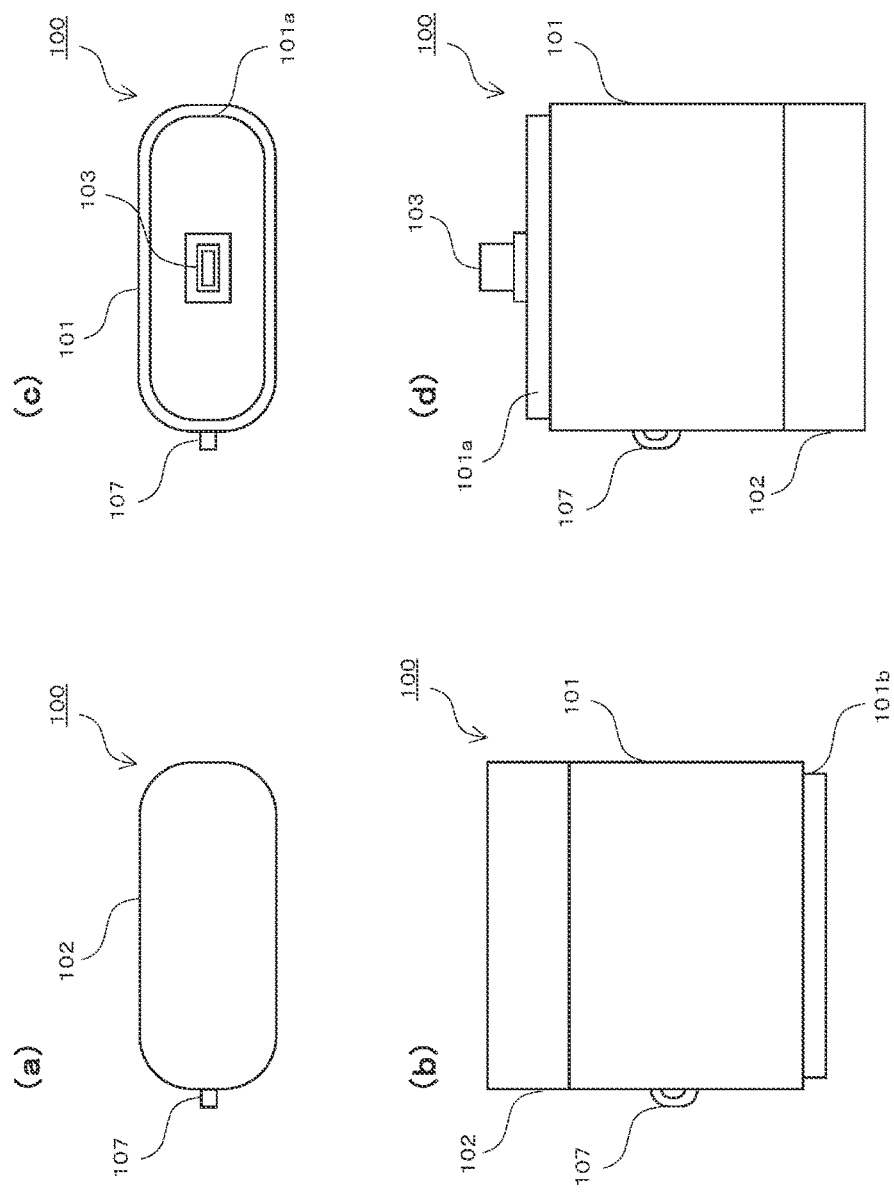
FIGS. 1 and 2 are diagrams showing a configuration of a communication apparatus according to an embodiment.

A communication apparatus and a portable telephone to which the communication apparatus can be attached in an embodiment of the present disclosure will be described hereinafter with reference to the drawings. The same or corresponding elements in the drawings have the same reference characters allotted and description thereof will not be repeated.

Figure 2:
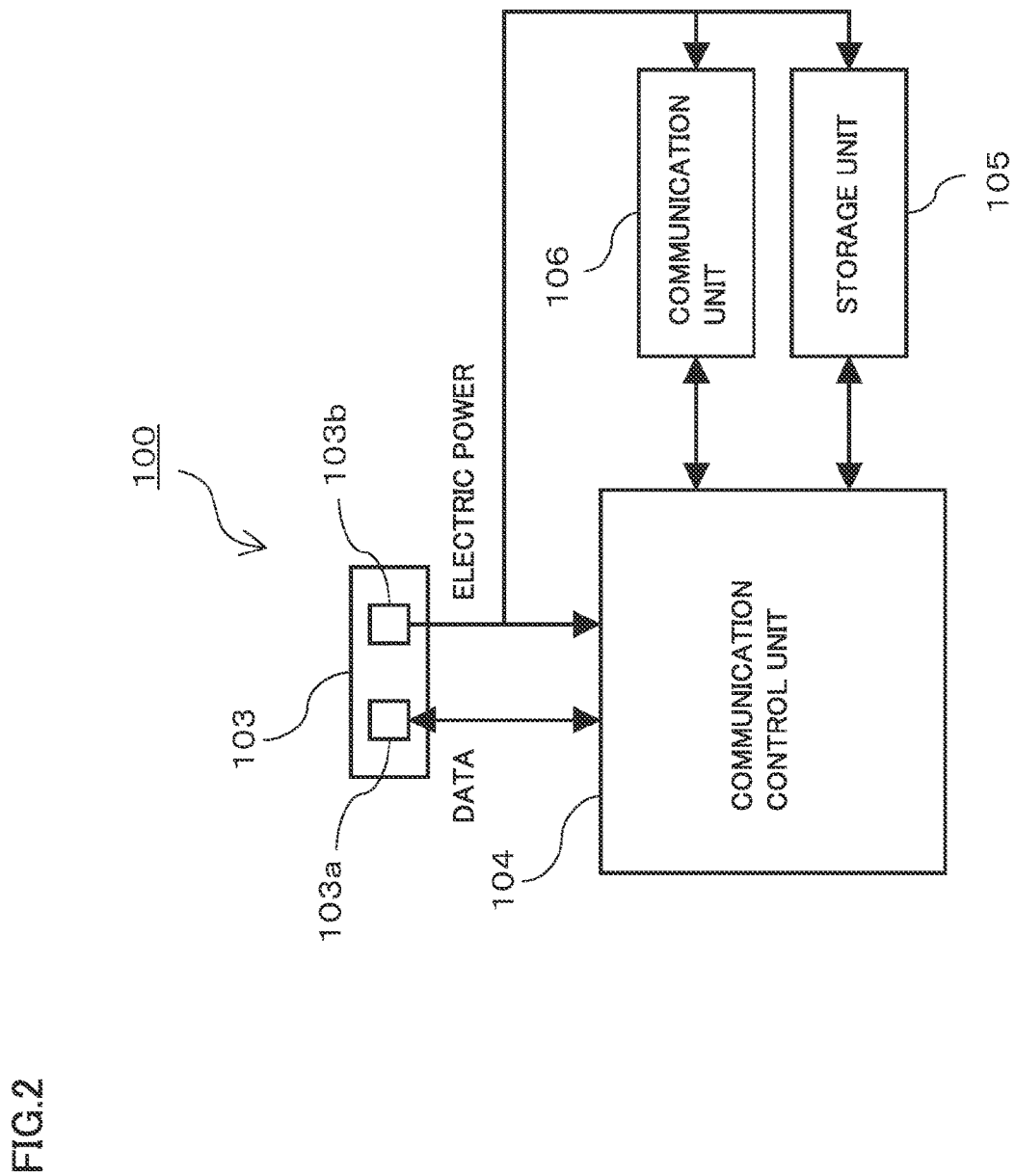

FIGS. 1 and 2 are diagrams showing a configuration of a communication apparatus 100. FIG. 1(a) and FIG. 1(b) are a plan view and a front view of a state that a cap 102 is attached to an upper portion of a housing 101, respectively. FIG. 1(c) and FIG. 1(d) are a plan view and a front view of a state that cap 102 is attached to a lower portion of housing 101, respectively. FIG. 2 is a block diagram of communication apparatus 100.

Communication apparatus 100 includes housing 101, cap 102, a plug-side connector 103, a communication control unit 104, a storage unit 105, and a communication unit 106. An upper end portion 101a and a lower end portion 101b of housing 101 are smaller in outer diameter than other portions such that cap 102 can be fitted. An attachment portion 107 to which a strap can be attached may be integrally formed on a side surface of housing 101. Communication apparatus 100 can be coupled, for example, to a key via the strap. A user can carry communication apparatus 100, for example, together with a key.

Plug-side connector 103 is provided on an upper surface of housing 101. When communication apparatus 100 is not in use, the upper portion of housing 101 is covered with cap 102 as in FIG. 1(a) and FIG. 1(b). Plug-side connector 103 is protected by being covered with cap 102. When communication apparatus 100 is used, cap 102 is removed from the upper portion of housing 101 and placed on the lower portion of housing 101 as in FIG. 1(c) and FIG. 1(d).

Plug-side connector 103 includes at least a data input and output port 103a to and from which data is input and output and a power supply port 103b to which electric power is input. Data input and output port 103a is connected to communication control unit 104. Power supply port 103b is connected to communication control unit 104, storage unit 105, and communication unit 106.

Communication control unit 104, storage unit 105, and communication unit 106 are located in housing 101.

Storage unit 105 includes, for example, a read only memory (ROM) and a random access memory (RAM). Storage unit 105 stores a program for having communication control unit 104 perform communication control processing which will be described later. Storage unit 105 stores identification information for having a portable telephone to which communication apparatus 100 is attached recognize that an attached apparatus is communication apparatus 100.

Communication control unit 104 includes a processor such as a central processing unit (CPU). Communication control unit 104 can control storage unit 105 and, for example, communication unit 106, in accordance with a program stored in storage unit 105.

Communication unit 106 includes, for example, a circuit for converting a signal and an antenna transmitting and receiving radio waves. Communication unit 106 can convert a data signal input from communication control unit 104 into a radio signal under a modulation scheme in accordance with prescribed specifications and transmit the converted radio signal to the outside through the antenna. Magnitude of transmission output of a radio signal by communication unit 106 is set to allow the radio signal to travel a distance considerably beyond coverage by a wireless communication function which a portable telephone can have, for example, a distance of several ten Km.

When communication unit 106 receives a radio signal transmitted from another communication apparatus 100 attached to a portable telephone which is a communication counterpart and converted under the modulation scheme in accordance with the prescribed specifications, it can convert the received radio signal into a data signal and output the converted data signal to communication control unit 104.

A configuration of a portable telephone 200 to which communication apparatus 100 can be attached will be described. A communication system includes portable telephone 200 and communication apparatus 100.

Figure 3:
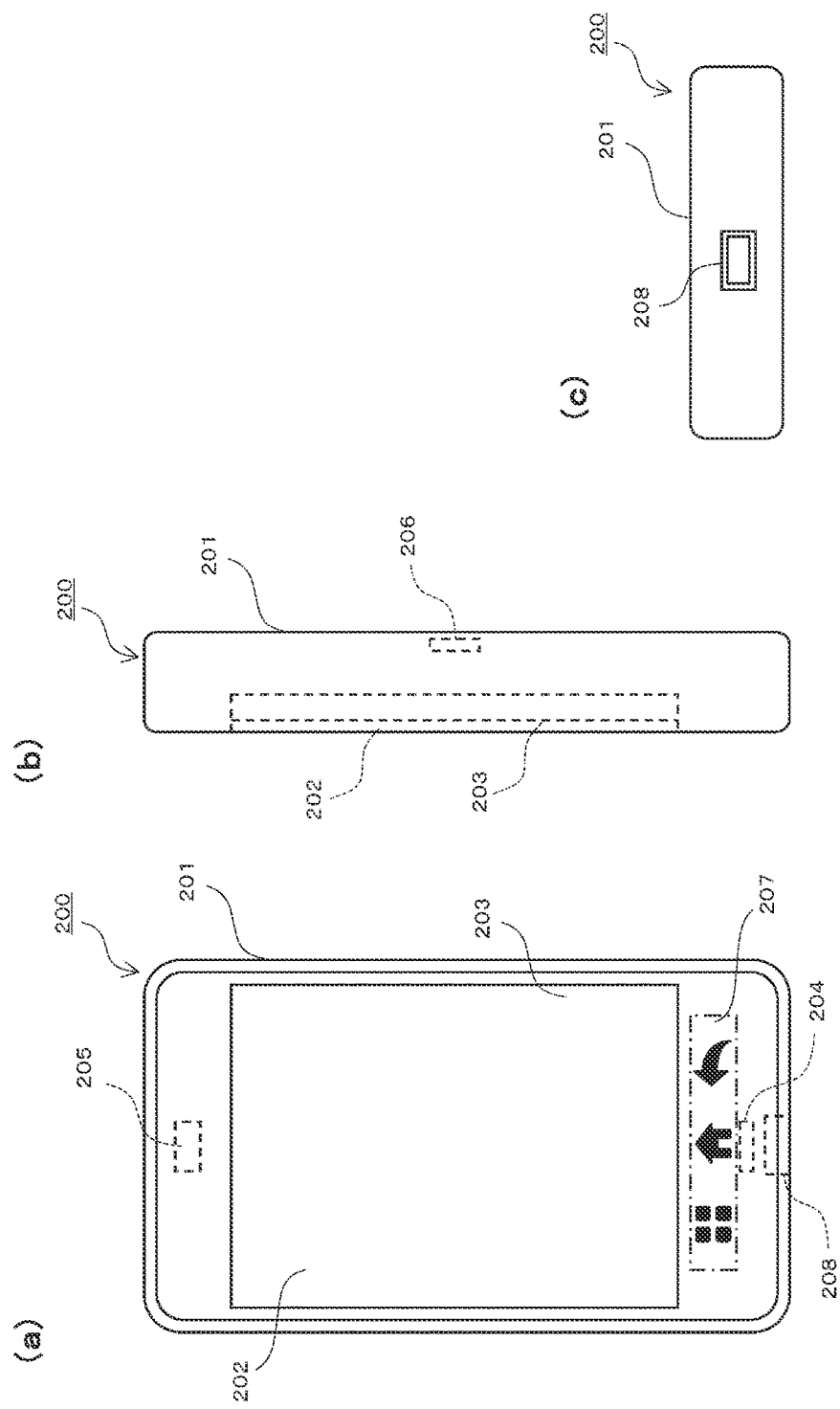
FIG. 3 is a diagram showing appearance of a portable telephone according to an embodiment.

FIG. 3(a) to FIG. 3(c) are a front view, a right side view, and a bottom view of portable telephone 200, respectively.

Portable telephone 200 includes a cabinet 201, a display 202, a touch panel 203, a microphone 204, an ear speaker 205, an external speaker 206, a key operation unit 207, and a socket-side connector 208.

Cabinet 201 may have a substantially rectangular geometry when viewed from the front. Display 202 is located on a front side of cabinet 201. For example, a liquid crystal display or an organic EL display is employed for display 202. Touch panel 203 may be on a surface of display 202. For example, a touch panel of various types such as a capacitance type or a pressure sensitive type is employed for touch panel 203.

Microphone 204 is located at a lower end portion in cabinet 201. Ear speaker 205 is located in an upper end portion in cabinet 201. External speaker 206 is located on a rear side in a central portion in cabinet 201. During a telephone call, received voice and sound received from a device which is a communication counterpart (for example, a portable telephone) is output from ear speaker 205 and voice uttered by a user is input to microphone 204. Sound such as a ring tone of a telephone is output from external speaker 206.

Key operation unit 207 is provided under display 202 in cabinet 201. Key operation unit 207 includes various types of operation keys such as a home key for making transition of a screen back to a home screen or a back key for making transition of a screen back to an immediately preceding screen. Key operation unit 207 may be implemented by a physical button or a touch sensor. The key operation unit may be displayed on display 202, instead of being provided under display 202.

Socket-side connector 208 is provided in a bottom surface of cabinet 201. A plug-side connector of a data cable is connected to socket-side connector 208 when data is transmitted and received between portable telephone 200 and an external device such as a personal computer. A plug-side connector of a power supply cable from a charger is connected to socket-side connector 208 when portable telephone 200 is charged. Plug-side connector 103 of communication apparatus 100 is connected to socket-side connector 208 during communication by using communication apparatus 100 as will be described later.

Figure 4:
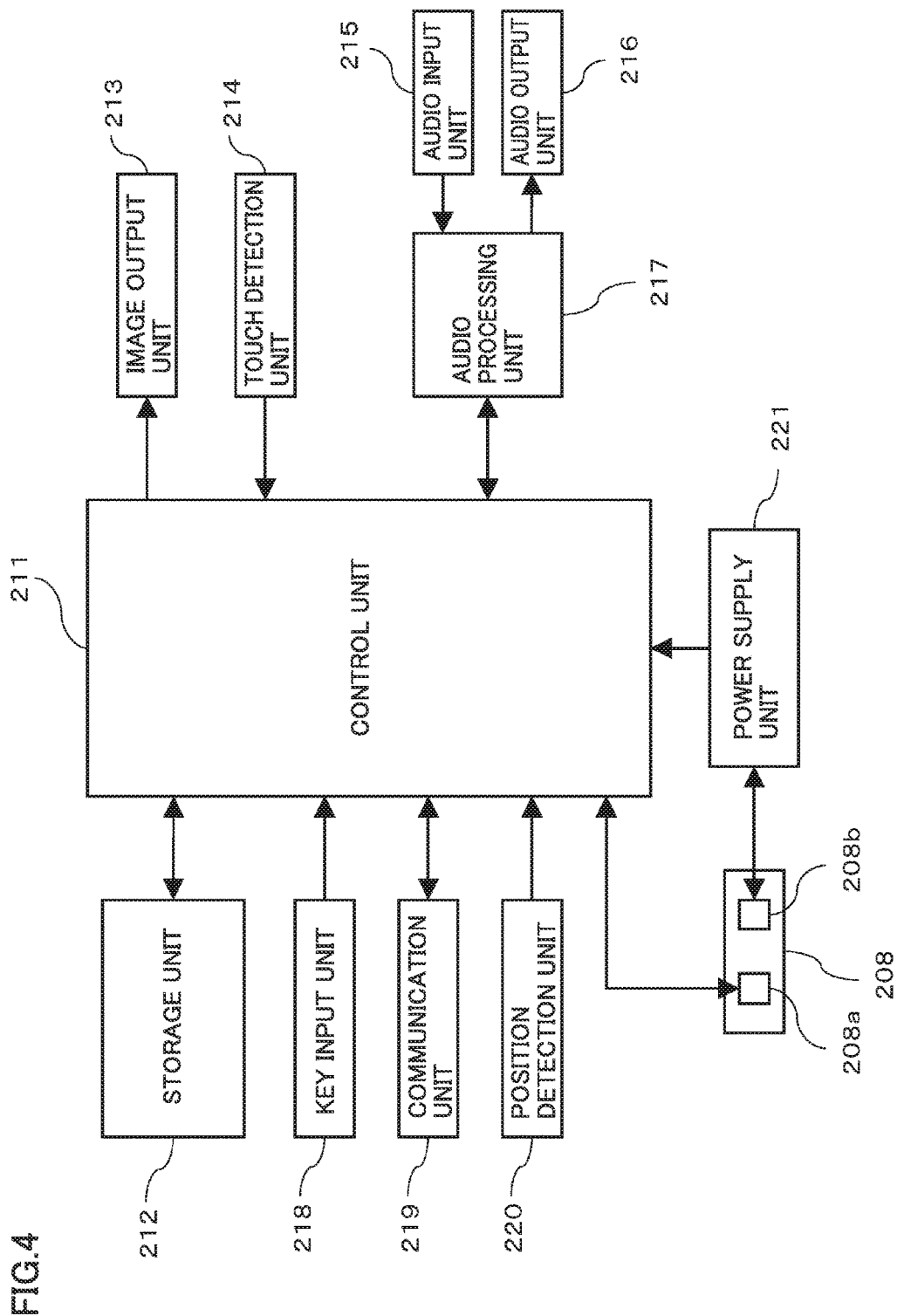
FIG. 4 is a block diagram showing an overall configuration of the portable telephone according to an embodiment.

FIG. 4 is a block diagram showing an overall configuration of portable telephone 200.

Portable telephone 200 includes a control unit 211, a storage unit 212, an image output unit 213, a touch detection unit 214, an audio input unit 215, an audio output unit 216, an audio processing unit 217, a key input unit 218, a communication unit 219, a position detection unit 220, and a power supply unit 221.

Storage unit 212 includes, for example, a ROM, a RAM, or an external memory. Storage unit 212 stores an application program such as a telephone, a message, a web browser, or a telephone book, in addition to a control program for controlling each unit of portable telephone 200. Storage unit 212 stores a communication program executed by control unit 211 when communication using communication apparatus 100 is established. A program is stored not only in storage unit 212 at the time of manufacturing of portable telephone 200 by a manufacturer but also in storage unit 212, for example, through a communication network or such a storage medium as a memory card or a CD-ROM.

Control unit 211 includes a processor such as a CPU. Control unit 211 can control each unit configuring portable telephone 200 (for example, storage unit 212, image output unit 213, touch detection unit 214, audio input unit 215, audio output unit 216, audio processing unit 217, key input unit 218, communication unit 219, and position detection unit 220) in accordance with a program stored in storage unit 212.

Image output unit 213 includes, for example, display 202. Image output unit 213 has display 202 display an image (a screen) based on a control signal from control unit 211 and an image signal. Touch detection unit 214 includes, for example, touch panel 203, and can detect a touch operation onto display 202 through touch panel 203. More specifically, touch detection unit 214 can detect a position where touch panel 203 has been touched and output a position signal to control unit 211.

Audio input unit 215 includes, for example, microphone 204, and can output an electric signal based on voice and sound collected by microphone 204 to audio processing unit 217. Audio output unit 216 includes, for example, ear speaker 205 and external speaker 206, and can have ear speaker 205 or external speaker 206 output sound based on an electric signal from audio processing unit 217. Audio processing unit 217 can subject an electric signal from audio input unit 215, for example, to A/D conversion and output a converted digital audio signal to control unit 211. Audio processing unit 217 can subject a digital audio signal from control unit 211, for example, to decoding processing and D/A conversion and output the converted electric signal to audio output unit 216.

Key input unit 218 can output to control unit 211, when each operation key of key operation unit 207 is pressed, a signal corresponding to the pressed operation key.

Communication unit 219 includes a circuit for placing a call or carrying out communication, for example, for converting a signal, and an antenna transmitting and receiving radio waves. Communication unit 219 can convert a signal for a telephone call or communication input from control unit 211 into a radio signal and transmit the converted radio signal to a base station through the antenna. Communication unit 219 can convert a radio signal received through the antenna into a signal in a format which can be used by control unit 211 and output the converted signal to control unit 211. Communication unit 219 may include a wireless communication circuit for establishing wireless communication within a range of several ten meters.

Position detection unit 220 includes, for example, a GPS sensor and can output position data (latitude and longitude) of a current position determined by the GPS sensor to control unit 211.

Power supply unit 221 includes a battery and supplies electric power to control unit 211 and other units.

Socket-side connector 208 includes at least a data input and output port 208a to and from which data is input and output and a power supply port 208b to and from which electric power is input and output. Data input and output port 208a is connected to control unit 211 and power supply port 208b is connected to power supply unit 221.

When a plug-side connector of a power supply cable from a charger is connected to socket-side connector 208, electric power is input from the charger to power supply port 208b and input electric power is supplied to power supply unit 221. When plug-side connector 103 of communication apparatus 100 is connected to socket-side connector 208, electric power is output from power supply unit 221 to power supply port 208b.

At a location where radio waves (radio signals) do not reach a base station, portable terminal apparatus 200 may not be able to transmit and receive data to and from another portable terminal apparatus. When a disaster occurs and functions of base stations fail as well, similarly, portable terminal apparatus 200 may not be able to transmit and receive data to and from another portable terminal apparatus.

In an embodiment, data is directly transmitted and received to and from another portable terminal apparatus by attaching communication apparatus 100 to portable telephone 200.

Figure 5:
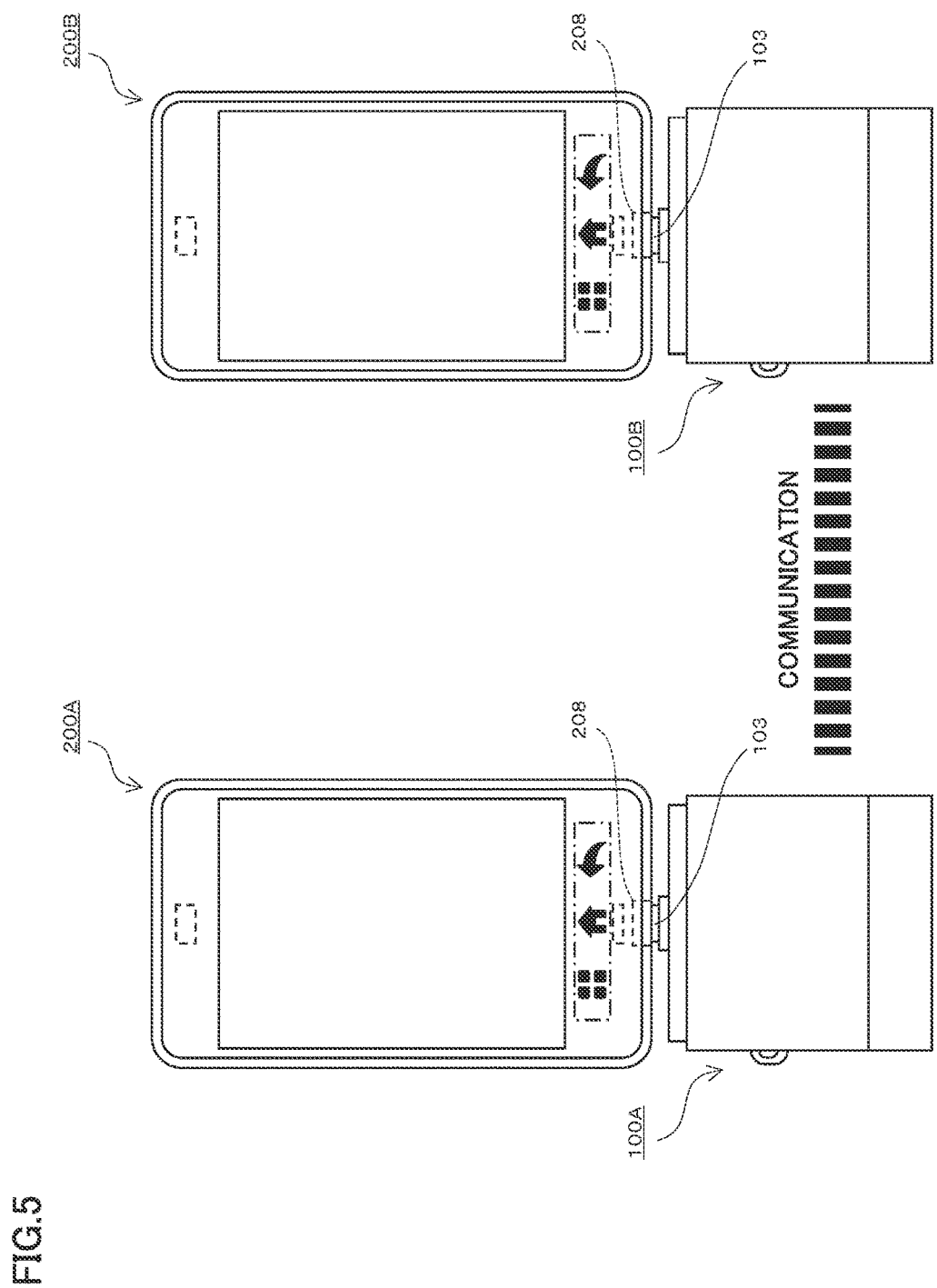
FIG. 5 is a diagram showing that two portable telephones communicate with each other by using communication apparatuses according to an embodiment.

FIG. 5 shows that two portable telephones 200A and 200B communicate with each other by using communication apparatuses 100A and 100B, respectively.

For example, when functions of base stations fail due to a disaster, communication via a base station between one portable telephone 200A and the other portable telephone 200B which are relatively distant from each other may fail. Even in such a case, a user of portable telephone 200A attaches communication apparatus 100A to portable telephone 200A, and a user of portable telephone 200B attaches communication apparatus 100B to portable telephone 200B, so that portable telephones 200A and 200B can directly communicate with each other. Communication apparatuses 100A and 100B are attached to portable telephones 200A and 200B, respectively, by inserting plug-side connector 103 into socket-side connector 208. Coupling setting has been made between communication apparatus 100A and communication apparatus 100B such that communication therebetween is allowed. Coupling setting may be made by a manufacturer at the time of manufacturing or made by a user after a product is purchased.

As communication apparatuses 100A and 100B are attached to portable telephones 200A and 200B, respectively, in portable telephones 200A and 200B, control unit 211 can perform transmission and reception control processing for data transmission and reception by using communication apparatuses 100A and 100B in accordance with a communication program. In communication apparatuses 100A and 100B, communication control unit 104 can perform communication control processing. Thus, two communication apparatuses 100A and 100B communicate with each other without going through a base station and two portable telephones 200A and 200B transmit and receive data such as text data or audio data therebetween.

An operation of communication apparatus 100 and portable telephone 200 will be described below in detail. For the sake of convenience, communication apparatus 100A and portable telephone 200A are designated as a communication apparatus and a portable telephone of which operations are described, and communication apparatus 100B and portable telephone 200B are designated as a communication apparatus and a portable telephone which are communication counterparts of communication apparatus 100A and portable telephone 200A, respectively.

In communication apparatus 100A, when plug-side connector 103 is connected to socket-side connector 208, electric power is supplied from power supply unit 221 of portable telephone 200A through power supply port 208b of socket-side connector 208 and through power supply port 103b of plug-side connector 103 to communication control unit 104, storage unit 105, and communication unit 106. Communication control unit 104 is launched so that communication control processing is started.

Figure 6:
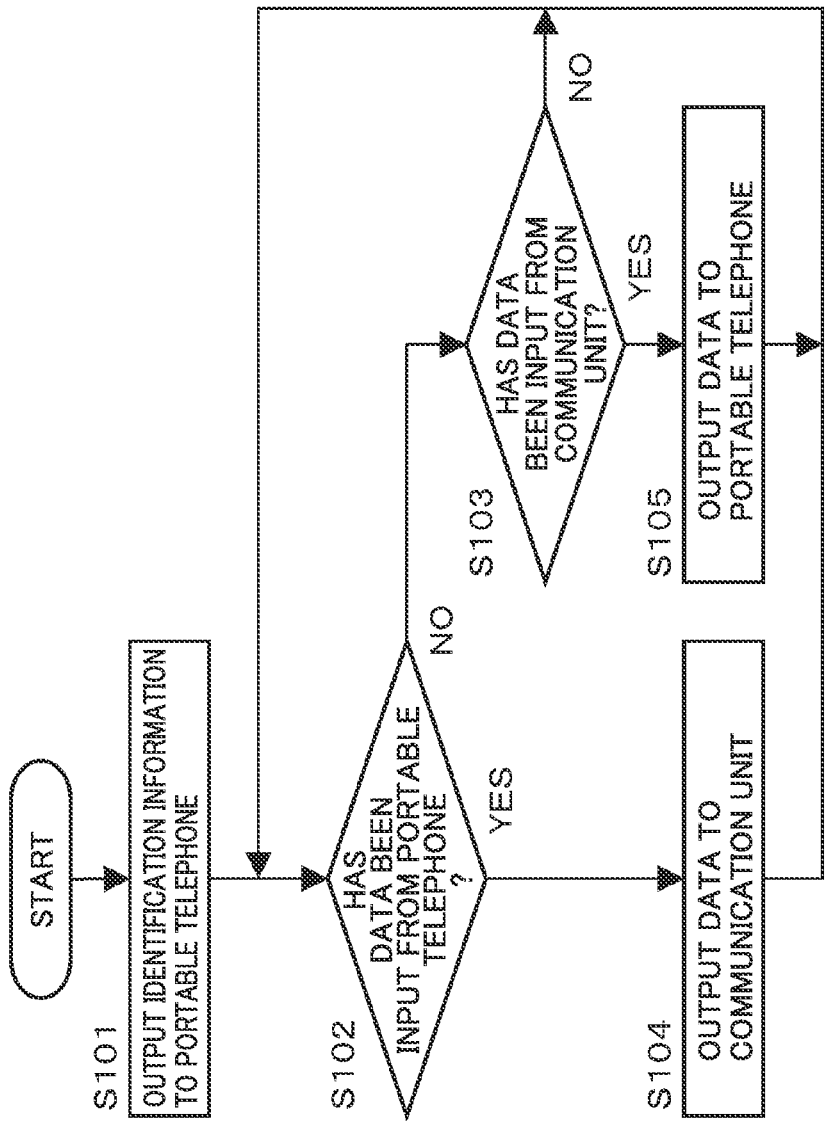
FIG. 6 is a flowchart showing communication control processing performed on a communication apparatus side according to an embodiment.

FIG. 6 is a flowchart showing communication control processing performed in communication apparatus 100A.

As processing is started, communication control unit 104 can read identification information from storage unit 105 and output the read identification information to portable telephone 200A through data input and output port 103a of plug-side connector 103 (S101). In portable telephone 200A, when control unit 211 detects connection of communication apparatus 100A based on the identification information, transmission and reception control processing is started. Various data (text data, audio data, or position data) can be exchanged between communication apparatus 100A and portable telephone 200A.

Communication control unit 104 can determine whether or not data has been input from portable telephone 200A (S102). Communication control unit 104 can determine whether or not data has been input from communication unit 106 (S103). When data is input from portable telephone 200A through data input and output port 103a of plug-side connector 103 (S102: YES), communication control unit 104 can output the input data to communication unit 106 (S104). The data input to communication unit 106 is converted into a radio signal and transmitted to the outside.

When communication unit 106 receives a radio signal from communication apparatus 100B attached to portable telephone 200B which is a communication counterpart, communication unit 106 can convert the received radio signal into data and output the data to communication control unit 104. When data is input from communication unit 106 (S103: YES), communication control unit 104 can output the input data to portable telephone 200A through data input and output port 103a of plug-side connector 103 (S105).

In portable telephone 200A, when control unit 211 recognizes attachment of communication apparatus 100A based on the identification information obtained from communication apparatus 100A as described above, transmission and reception control processing is started. The transmission and reception control processing is automatically started as communication apparatus 100A is attached to portable telephone 200A without a user performing a prescribed start operation.

Figure 7:
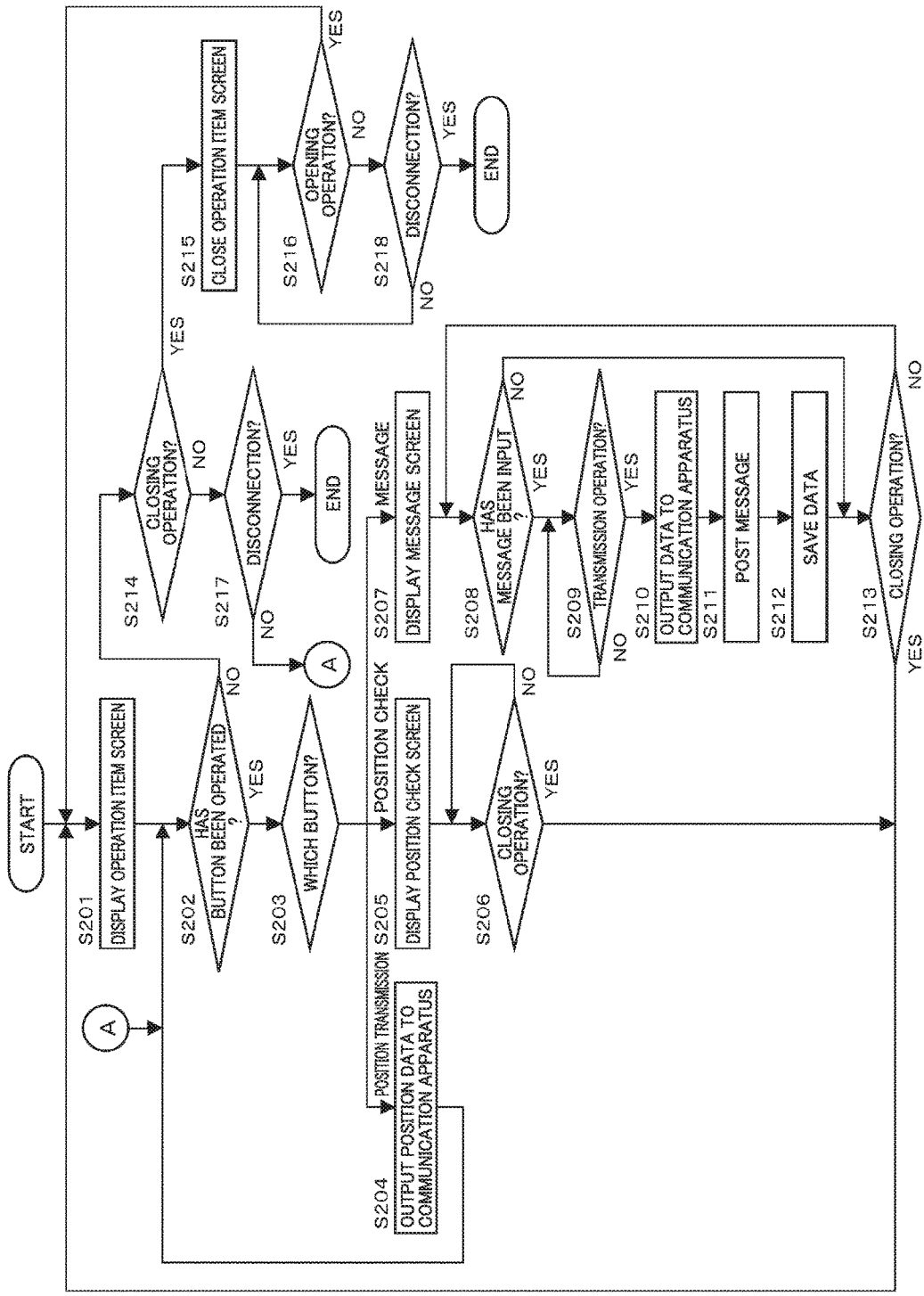
FIG. 7 is a flowchart showing transmission and reception control processing performed on a portable telephone side according to an embodiment.

FIG. 7 is a flowchart showing the transmission and reception control processing performed in portable telephone 200A. FIGS. 8A to 10B are diagrams each showing one example of various operation screens displayed on display 202 when the transmission and reception control processing is performed.

Figure 8A:
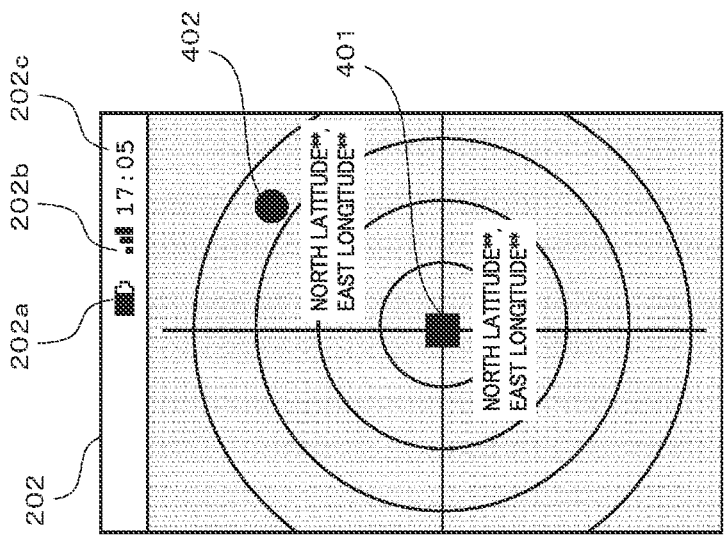
FIG. 8A is a diagram showing one example of various operation screens displayed on a display when the transmission and reception control processing is performed according to an embodiment.

As the processing is started, control unit 211 can control image output unit 213 to have display 202 display an operation item screen (S201). As shown in FIG. 8A, the operation item screen includes a position transmission button 301, a position check button 302, and a message button 303. The operation item screen shown in FIG. 8A is by way of example and types of buttons which can be selected by a user are not limited thereto.

Control unit 211 can determine which button has been operated, based on detection by touch detection unit 214 (S202). When any button is operated (S202: YES), control unit 211 can determine which button has been operated (S203). When the operated button is position transmission button 301 (S203: position transmission), control unit 211 can obtain position data from position detection unit 220 and output the obtained position data to communication apparatus 100A through data input and output port 208a of socket-side connector 208 (S204). The position data is transmitted from communication apparatus 100A to communication apparatus 100B which is the communication counterpart.

Figure 8B:
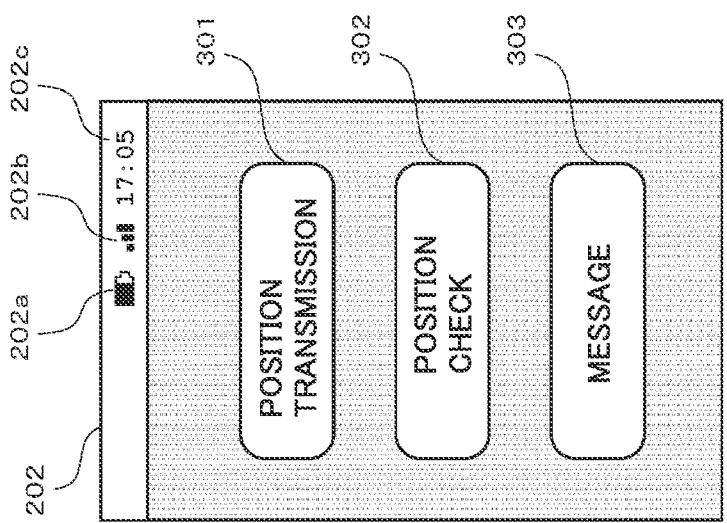
FIG. 8B is a diagram showing another example of various operation screens displayed on the display when the transmission and reception control processing is performed according to an embodiment.

When the operated button is position check button 302 (S203: position check), control unit 211 can have display 202 display a position check screen (S205). As shown in FIG. 8B, in the position check screen, a first marker 401 indicating a position of portable telephone 200A of a user thereof is displayed in the center and a second marker 402 indicating a position of portable telephone 200B which is the communication counterpart is displayed at a position on the position check screen in accordance with a distance and a direction from portable telephone 200A. A latitude and a longitude are displayed under first marker 401 and second marker 402. When position data of portable telephone 200B which is the communication counterpart has not been obtained, second marker 402 is not displayed. When a closing operation is performed while the position check screen is displayed (S206: YES), control unit 211 can close the position check screen and have the screen return to the operation item screen (S201). A prescribed operation key of key operation unit 207 can be used for the closing operation.

When message button 303 has been operated (S203: message), control unit 211 can have display 202 display a message screen (S207). As shown in FIG. 9A, the message screen includes a message post region 501, a text input button 502, an audio input button 503, and a transmission button 504.

When a text message is to be input, a user touches text input button 502. A text input window (not shown) including a keyboard is displayed on the message screen. The user inputs a text message by using the keyboard. When an audio message is to be input, the user touches audio input button 503. An audio input window (not shown) for an audio input operation is displayed on the message screen. The user inputs an audio message through an operation on the audio input window.

When a text or audio message is input (S208: YES) and a touch operation (transmission operation) onto transmission button 504 is performed (S209: YES), control unit 211 can output data of the input message (text data or audio data) to communication apparatus 100A (S210). Message data is transmitted from communication apparatus 100A to communication apparatus 100B which is the communication counterpart.

Control unit 211 can have the transmitted message posted in message post region 501 (S211). As shown in FIG. 9B, in a case of a text message, a balloon 505 showing the message is displayed in message post region 501, and in a case of an audio message, a balloon 506 in which a picture of a microphone is depicted is displayed in message post region 501. When balloon 506 is touched, control unit 211 can have external speaker 206 output the audio message. Control unit 211 can have storage unit 212 save data of the transmitted message (S212).

When a closing operation is performed while the message screen is displayed (S213: YES), control unit 211 can close the message screen and have the screen return to the operation item screen (S201).

When the closing operation is performed while the operation item screen is displayed (S214: YES), control unit 211 can close the operation item screen (S215). The transmission and reception control processing is continued even when the operation item screen is closed, and when an operation to open the operation item screen is performed (S216: YES), control unit 211 can again have display 202 display the operation item screen (S201). The opening operation is defined, for example, as an operation to touch an icon corresponding to a communication program displayed on a home screen.

When communication apparatus 100A is removed from portable telephone 200A and plug-side connector 103 is disconnected from socket-side connector 208 while the operation item screen is displayed or not displayed (S217: YES, S218: YES), control unit 211 can quit the transmission and reception control processing.

Figure 10B:
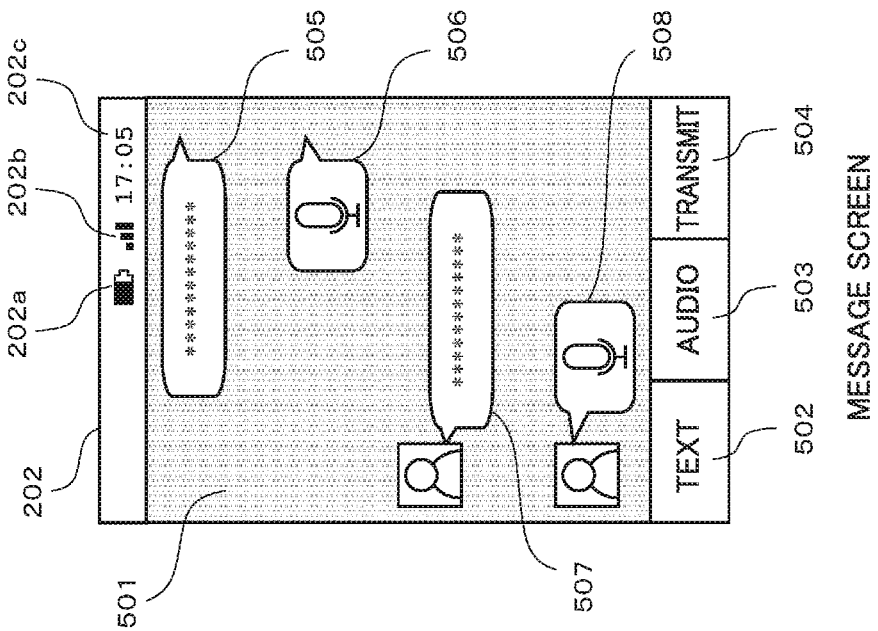
FIG. 10B is a diagram showing another example of various operation screens displayed on the display when the transmission and reception control processing is performed according to an embodiment.
Figure 10A:
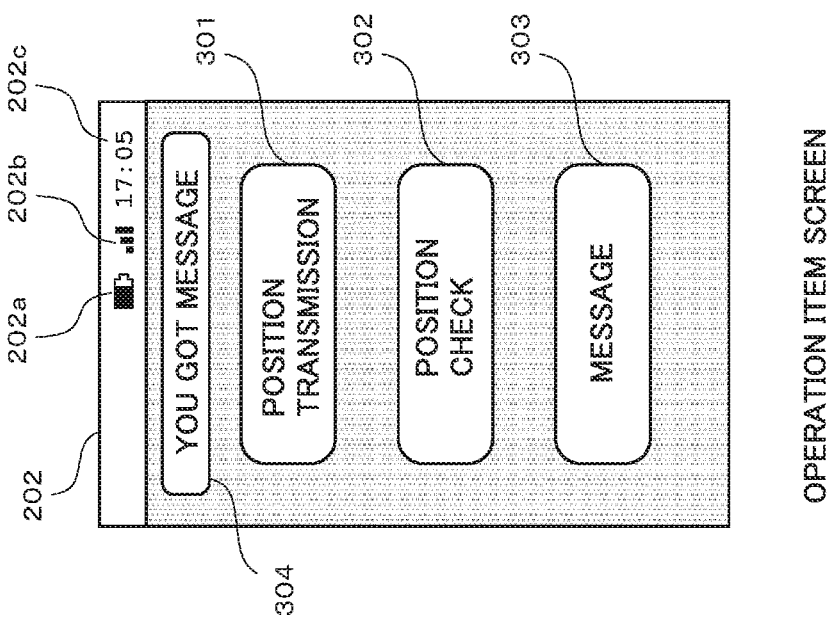
FIG. 10A is a diagram showing one example of various operation screens displayed on the display when the transmission and reception control processing is performed according to an embodiment.

Though not shown in the flowchart in FIG. 7, when data has reached portable telephone 200A from portable telephone 200B which is the communication counterpart, control unit 211 can have storage unit 212 save the received data. When the operation item screen is displayed, control unit 211 can have a notification window 304 indicating arrival of data displayed on the operation item screen as shown in FIG. 10A. In a case that the received data is message data, when the message screen is subsequently opened, control unit 211 can have a balloon 507 corresponding to a text message from a communication counterpart or a balloon 508 corresponding to an audio message displayed in message post region 501 as shown in FIG. 10B. When data arrives while the operation item screen is closed, control unit 211 can launch the operation item screen and have notification window 304 displayed on the launched operation item screen.

Operation screens in FIGS. 8A to 10B include a mark 202a indicating a state of charge of a battery of portable telephone 200A, an antenna mark 202b indicating intensity of radio waves, and information 202c on current time. Antenna mark 202b may be displayed when another portable telephone 200 to which communication apparatus 100 is connected is present around portable telephone 200 in which antenna mark 202b is displayed and communication with another portable telephone 200 can be carried out through communication apparatus 100. When communication via communication apparatus 100 cannot be carried out as in a case that another portable telephone 200 to which communication apparatus 100 is connected is not present in the surroundings, antenna 202b does not have to be displayed. A user can determine whether or not other portable telephone 200 to which communication apparatus 100 is connected is present within coverage by communication apparatus 100 connected to user's portable telephone 200.

<Effect of Embodiment>

According to one embodiment of the present disclosure, a communication apparatus can allow a user to communicate with a desired counterpart by using a portable terminal apparatus even when radio waves may not reach a base station or when functions of the base station fail.

According to an embodiment, when communication via a base station may not be established such as when functions of the base station fail due to a disaster, users have only to connect plug-side connectors 103 of communication apparatuses 100 into socket-side connectors 208 of portable telephones 200 of the respective users, so that data can be transmitted and received between these portable telephones 200.

According to an embodiment, since communication apparatus 100 operates with electric power supplied from portable telephone 200, communication apparatus 100 does not have to incorporate an electric cell or a battery, and a main body of communication apparatus 100 can be reduced in size and weight and cost can be reduced.

According to an embodiment, as plug-side connector 103 is attached to socket-side connector 208, identification information is output from communication apparatus 100 to portable telephone 200 for automatically launching the operation item screen on portable telephone 200. The user does not have to perform an operation to launch the operation item screen after portable telephone 200 is attached to communication apparatus 100, and can quickly transmit data (position data, text data, or audio data) to a communication counterpart.

Though an embodiment of the present disclosure has been described above, the present disclosure is not restricted by an embodiment above or an embodiment of the present disclosure can variously be modified otherwise.

<Modification>

In an embodiment described above, portable telephone 200 starts the transmission and reception control processing when it detects connection of communication apparatus 100. If portable telephone 200 does not have a prescribed communication program for communication via communication apparatus 100 in advance, it may not be able to start transmission and reception control processing in spite of detection of connection of communication apparatus 100. In a modification, even when portable telephone 200 does not have such a communication program in advance, a communication program is supplied from communication apparatus 100 to portable telephone 200 at the time when communication apparatus 100 is connected to portable telephone 200, so that portable telephone 200 can start the transmission and reception control processing.

This communication program allows portable telephone 200 to communicate through communication apparatus 100. For example, the communication program includes a setting program for allowing data exchange between portable telephone 200 and communication apparatus 100 and a conversion program for converting data output from portable telephone 200 to communication apparatus 100 into a signal which can be communicated between communication apparatuses 100.

Figure 11A:
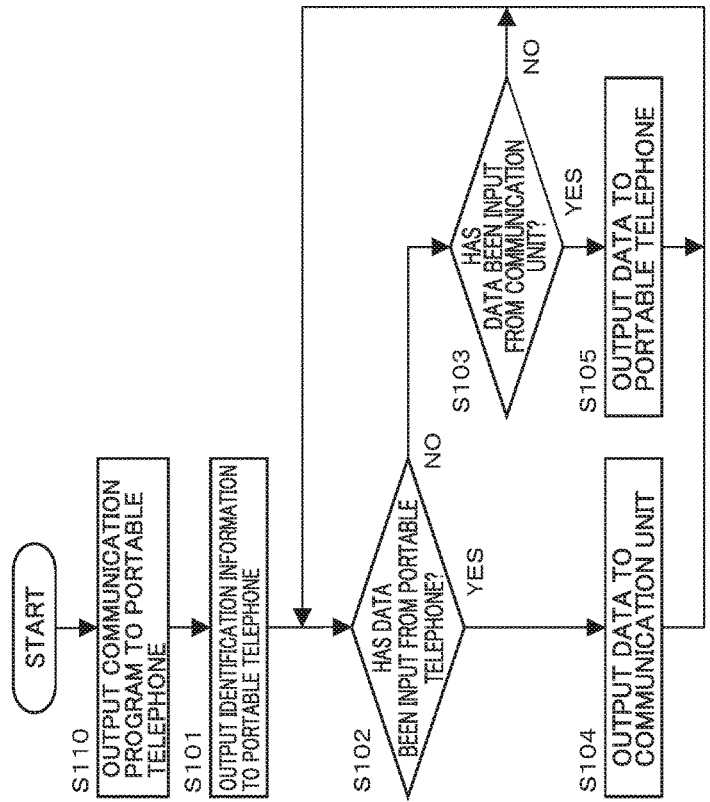
FIG. 11A is a block diagram of a communication apparatus for illustrating a configuration of the communication apparatus according to a modification.
Figure 11B:
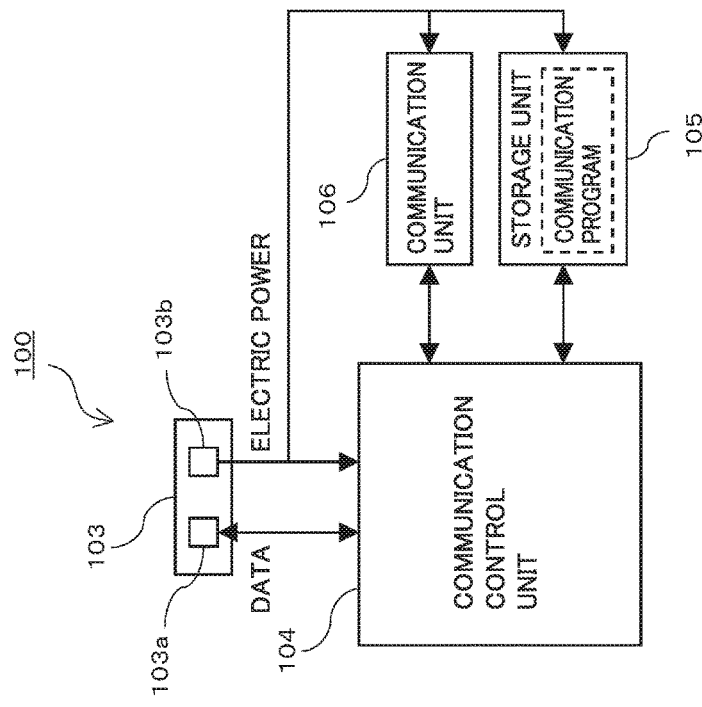
FIG. 11B is a flowchart showing communication control processing for illustrating the configuration of the communication apparatus according to a modification.

FIG. 11A is a block diagram of communication apparatus 100 for illustrating a configuration of communication apparatus 100 according to a modification. FIG. 11B is a flowchart showing communication control processing for illustrating the configuration of communication apparatus 100 according to a modification.

As shown in FIG. 11A, in communication apparatus 100 in the present modification, a communication program for having control unit 211 of portable telephone 200 perform transmission and reception control processing is stored in storage unit 105.

As shown in FIG. 11B, in communication apparatus 100 in the present modification, as the communication control processing is started, communication control unit 104 can read the communication program from storage unit 105 and output the communication program to portable telephone 200 (S110) before it transmits identification information.

According to such a configuration, even though a communication program is not installed in portable telephone 200 in advance, a user can transmit and receive data by using communication apparatus 100 simply by attaching communication apparatus 100 to portable telephone 200.

<Other Modification>

In an embodiment above, position data is output from portable telephone 200 to communication apparatus 100 by operating position transmission button 301 on the operation item screen. When the transmission and reception control processing is started, control unit 211 may automatically output position data to communication apparatus 100 before or after the operation item screen is displayed. In this case, the processing in step S204 in FIG. 7 is performed before or after the processing in step S201. Position transmission button 301 may be deleted from the operation item screen. Communication apparatus 100 is configured such that, when first connector 103 is attached to second connector 208, communication control unit 104 automatically receives position data from portable telephone 200 and outputs the position data to communication unit 106.

According to such a configuration, even when a user may be unable to perform a delicate operation as being involved in a disaster, the user can notify a communication counterpart of a current position of the user if only the user can attach communication apparatus 100 to portable telephone 200.

In an embodiment above, a configuration may be such that a telephone call can be placed between two portable telephones 200 by using communication apparatuses 100.

In an embodiment above, an example in which two communication apparatuses 100 for which coupling setting has been made to allow transmission therebetween are used for communication between two portable telephones 200 has been described. Transmission and reception of data among three or more portable telephones 100 is allowed by using three or more communication apparatuses 100 for which coupling setting has been made to allow transmission thereamong.

When communication apparatus 100 is connected to portable telephone 200, a function which can be used by a user such as position transmission and position check displayed on the operation item screen in FIG. 8A may be limited. In this case, use of applications installed in portable telephone 200 may not be allowed at all, or all or some of applications installed in portable telephone 200 may be used even when communication apparatus 100 is connected to portable telephone 200.

When communication apparatus 100 is connected to portable telephone 200, functions which can be used by a user may be limited, and when communication apparatus 100 is removed from portable telephone 200, all applications installed in portable telephone 200 may be used.

While communication apparatus 100 is connected to portable telephone 200, portable telephone 100 may transmit and receive data to and from another portable telephone via communication apparatus 100, not via a base station. For example, even when telephone communication can now reach a base station as a result of movement or increase in radio wave intensity while data is transmitted and received to and from another portable telephone with the use of communication apparatus 100 at a location where radio waves (radio signals) have not reached the base station from portable telephone 200, portable telephone 200 may maintain transmission and reception of data through communication apparatus 100 so long as communication apparatus 100 is connected to portable telephone 200.

Without being limited as such, portable telephone 200 may switch from communication via communication apparatus 100 to communication via a base station when telephone communication can now reach a base station while data is transmitted and received to and from another portable telephone with the use of communication apparatus 100 at a location where radio waves (radio signals) may not reach the base station from portable telephone 200.

Display 202 of portable telephone 200 may display a state of communication via a base station (for example, intensity of radio waves) and a state of communication via communication apparatus 100. FIG. 12A is a diagram showing one example of a screen showing each communication state of communication via a base station (long term evolution: LTE) and communication via communication apparatus 100 on display 202 and showing one example of a screen when a state of communication via communication apparatus 100 is good while radio waves may not reach the base station. FIG. 12B is a diagram showing one example of a screen showing each communication state of communication via a base station (LTE) and communication via communication apparatus 100 on display 202 and showing one example of a screen when radio waves now reach the base station while a good state of communication via communication apparatus 100 is maintained.

In FIGS. 12A and 12B, a state of communication is represented by the number of antennas on antenna marks 202d and 202e. A greater number of antennas indicate a better state of communication, whereas a smaller number of antennas indicate a poorer state of communication. Communication via a base station is shown with a character "LTE" together with antenna mark 202d and communication via communication apparatus 100 is shown with a character indicating communication via communication apparatus 100 such as "PBS" (Portable Base Station), together with antenna mark 202e. A manner of representation of a state of communication is not limited as such.

In this case, a user of portable telephone 200 can recognize a state of communication via a base station and a state of communication via communication apparatus 100. Therefore, when the user recognizes that a state of communication via a base station is improved, the user can perform such an operation as removing communication apparatus 100 from portable telephone 200 or to switch a communication scheme from communication via prescribed communication apparatus 100 to communication via the base station. For example, when communication apparatus 100 is removed from portable telephone 200, antenna mark 202e indicating a state of communication via communication apparatus 100 is no longer displayed.

A configuration may be such that, while communication apparatus 100 is connected to portable telephone 200, a state of communication via communication apparatus 100 is shown and a state of communication via a base station is not shown.

Though portable telephone 200 to which communication apparatus 100 is attached is of a smart phone type in an embodiment above, a portable telephone to which communication apparatus 100 is attached may be a portable telephone of any type such as a straight type, a foldable type, or a slide type. A portable terminal apparatus to which communication apparatus 100 is attached is not limited to a portable telephone, and a portable terminal apparatus such as a personal digital assistant (PDA) or a tablet PC is applicable.

An embodiment of the present disclosure can otherwise variously be modified as appropriate within the scope of the technical concept expressed in the terms of the claims.

Though an embodiment of the present disclosure has been described, it should be understood that an embodiment disclosed herein is illustrative and non-restrictive in every respect. The scope of the present disclosure is defined by the terms of the claims and is intended to include any modifications within the scope and meaning equivalent to the terms of the claims.

The invention claimed is:

1. A communication apparatus, comprising:
a first connector configured to be attachable to and removable from a second connector of a portable terminal apparatus, to which a cable is attached in transmission and reception of data to and from another device;
a communication unit configured to convert data into a radio signal and transmit the radio signal and to convert a received radio signal into data;
a storage unit configured to store a communication program for having the portable terminal apparatus transmit and receive data through the communication apparatus; and
at least one processor configured to receive data from the portable terminal apparatus through the first connector, output the received data to the communication unit, receive data converted by the communication unit, output the received data to the portable terminal apparatus through the first connector, read the communication program from the storage unit, and output the communication program to the portable terminal apparatus when the first connector is attached to the second connector,
when the communication apparatus is connected to the portable terminal apparatus and the portable terminal apparatus cannot communicate with another portable terminal apparatus via at least one base station, the portable terminal apparatus communicating with another portable terminal apparatus via the communication apparatus in accordance with the communication program.

2. The communication apparatus according to claim 1, wherein the first connector includes a port for input of electric power, the port for input of electric power is connected to a port for output of electric power included in the second connector, and electric power for operating the at least one processor and the communication unit is supplied through the port for input of electric power from the portable terminal apparatus.

3. The communication apparatus according to claim 1, wherein the at least one processor is configured to output to the portable terminal apparatus, when the first connector is attached to the second connector, identification information for having the portable terminal apparatus recognize that an attached apparatus is the communication apparatus.

4. The communication apparatus according to claim 1, wherein the at least one processor is configured to automatically receive position data from the portable terminal apparatus and output the position data to the communication unit when the first connector is attached to the second connector.

5. A portable terminal apparatus connectable to a communication apparatus having a first connector and a storage unit storing a communication program for having the portable terminal apparatus transmit and receive data through the communication apparatus, the portable terminal apparatus comprising:
a second connector to which a cable is attached in transmission and reception of data to and from another device, the second connector being attachable and removable from the first connector;
a communication unit converting data into a radio signal and transmitting the radio signal and converting a received radio signal into data;
a display unit; and
at least one processor configured to have the display unit display an operation screen used for an operation for outputting data to the communication apparatus when the first connector of the communication apparatus is attached to the second connector,
when the communication apparatus is connected to the portable terminal apparatus, the communication apparatus outputting the communication program stored in the storage unit to the portable terminal apparatus when the first connector is attached to the second connector,
when the communication apparatus is not connected to the portable terminal apparatus, the portable terminal apparatus communicating with another portable terminal apparatus via at least one base station,
when the communication apparatus is connected to the portable terminal apparatus and the portable terminal apparatus cannot communicate with another portable terminal apparatus via the at least one base station, the portable terminal apparatus communicating with another portable terminal apparatus via the communication apparatus in accordance with the communication program.

6. The portable terminal apparatus according to claim 5, further comprising a position detection unit configured to detect a current position, wherein the at least one processor is configured to output data on the current position to the communication apparatus when the first connector of the communication apparatus is attached to the second connector.

7. A communication system, comprising:
a portable terminal apparatus; and
a communication apparatus,
the portable terminal apparatus including a second connector to which a cable is attached in transmission and reception of data to and from another device,
the communication apparatus including
a first connector configured to be attachable to and removable from the second connector of the portable terminal apparatus,
a communication unit configured to convert data into a radio signal and transmit the radio signal and to convert a received radio signal into data,
a storage unit configured to store a communication program for having the portable terminal apparatus transmit and receive data through the communication apparatus, and
at least one processor configured to receive data from the portable terminal apparatus through the first connector, output the received data to the communication unit, receive data converted by the communication unit, output the received data to the portable terminal apparatus through the first connector, read the communication program from the storage unit, and output the communication program to the portable terminal apparatus when the first connector is attached to the second connector,
when the communication apparatus is not connected to the portable terminal apparatus, the portable terminal apparatus communicating with another portable terminal apparatus via at least one base station, when the communication apparatus is connected to the portable terminal apparatus and the portable terminal apparatus cannot communicate with another portable terminal apparatus via the at least one base station, the portable terminal apparatus communicating with another portable terminal apparatus via the communication apparatus in accordance with the communication program.

8. The communication apparatus according to claim 1, wherein the at least one processor is configured to, when the first connector is attached to the second connector, automatically transmit the communication program to the portable terminal apparatus.

9. The portable terminal apparatus according to claim 5, wherein the operation screen includes a first indicator of a communication state of the communication unit with respect to the at least one base station, and when the first connector of the communication apparatus is attached to the second connector, the at least one processor is configured to modify the operation screen to include a second indicator of a communication state of the communication apparatus with respect to another communication apparatus.

10. The portable terminal apparatus according to claim 9, wherein the second indicator is displayed on the screen simultaneously with the first indicator.

11. The portable terminal apparatus according to claim 9, wherein the second indicator is displayed on the screen in place of the first indicator.

* * * * *